United States Patent
Brown

(10) Patent No.: US 6,711,170 B1
(45) Date of Patent: Mar. 23, 2004

(54) METHOD AND APPARATUS FOR AN INTERLEAVED NON-BLOCKING PACKET BUFFER

(75) Inventor: David A. Brown, Carp (CA)

(73) Assignee: Mosaid Technologies, Inc., Kanata (CA)

( * ) Notice: Subject to any disclaimer, the term of this patent is extended or adjusted under 35 U.S.C. 154(b) by 0 days.

(21) Appl. No.: 09/386,589

(22) Filed: Aug. 31, 1999

(51) Int. Cl.[7] .............................................. H04L 12/56
(52) U.S. Cl. .................................... 370/395.7; 370/412
(58) Field of Search ................................. 370/360, 371, 370/375, 377, 378, 379, 381, 382, 389, 412, 413, 414, 415, 416, 417, 418, 422, 423, 428, 429, 395.7, 395.71, 395.72

(56) References Cited

U.S. PATENT DOCUMENTS

| | | | | |
|---|---|---|---|---|
| 5,166,674 A | * | 11/1992 | Baum et al. | 370/473 |
| 5,463,755 A | | 10/1995 | Dumarot et al. | 395/475 |
| 6,122,274 A | * | 9/2000 | Kumar | 370/388 |
| 6,137,807 A | * | 10/2000 | Rusu et al. | 370/412 |
| 6,222,840 B1 | * | 4/2001 | Walker et al. | 370/360 |

FOREIGN PATENT DOCUMENTS

| | | |
|---|---|---|
| EP | 0 700 187 A | 6/1996 |
| EP | 0 828 403 A | 11/1998 |

* cited by examiner

Primary Examiner—Kwang Bin Yao
(74) Attorney, Agent, or Firm—Hamilton, Brook, Smith & Reynolds, P.C.

(57) ABSTRACT

Memory interleaving is performed to increase bandwidth of a common memory in a non-blocking switch. The switch receives packets from a plurality of ingress ports, stores the packets in the common memory, and forwards the packets to a plurality of egress ports. The common memory is physically divided into two banks to provide two way interleaving. Two way interleaving is performed by reading a packet to be forwarded to an egress port from one bank concurrently with writing a packet received from an ingress port to the other bank. The common memory is physically divided into four banks to provide four way interleaving. Four way interleaving is performed by concurrently reading and writing two even banks or two odd banks. Bank balancing techniques are also provided to keep the banks of the common memory at the same level of occupancy.

33 Claims, 14 Drawing Sheets

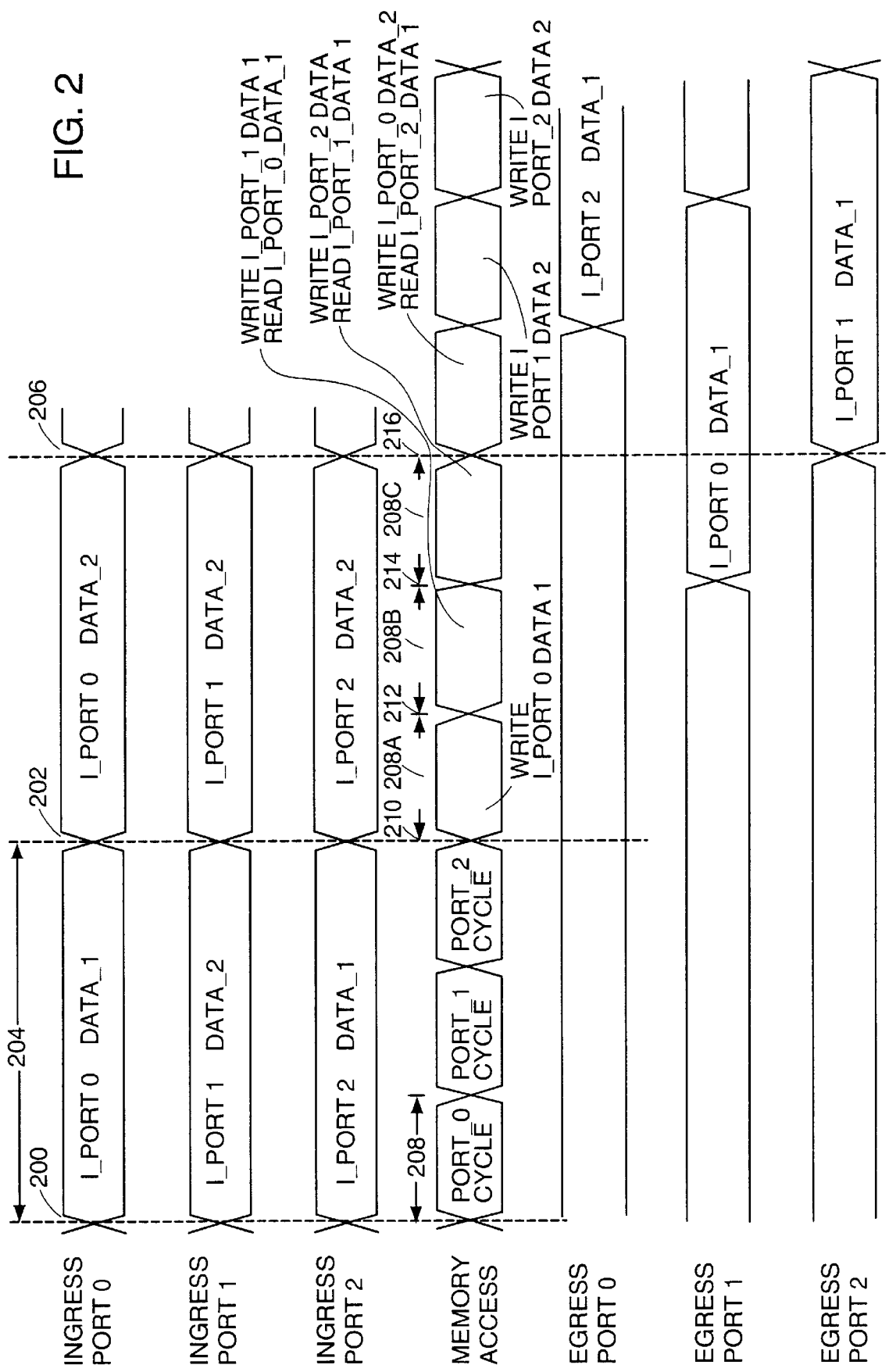

METHOD AND APPARATUS FOR AN INTERLEAVED NON-BLOCKING PACKET BUFFER

BACKGROUND OF THE INVENTION

A networking switch receives data packets from a number of ingress ports connected to the switch and provides the data packets to a number of egress ports connected to the switch. The switch determines the egress port to which the data packets are provided dependent on the destination address included in the data packet. A data packet received from an ingress port is stored in memory in the switch before being provided to the egress port.

The memory in the switch may be a common memory, in which all received data packets from all the ingress ports are stored, before being provided to the egress ports. A non-blocking switch allows all data received for all ingress ports to be provided to the egress ports. Non-blocking switches typically include a common memory in order to make the maximum amount of memory available to each of the ports.

The speed of a common memory switch is dependent on the memory bandwidth. The memory bandwidth is dependent on the memory access time, and the width of the memory, that is, the number of bytes accessed per memory access time. For example, if the common memory is 64 bytes wide and has an access time of 80 nanoseconds (ns), it takes 80 ns to write or read 64 bytes. If a ingress port connected to the switch is receiving data at 100 Megabits (M) bits per second, a bit is received every 10 ns, an 8-bit byte is received every 80 ns and 64 bytes are received every 5120 ns. After the 64 bytes of data are received, a write memory cycle is performed to write the 64 bytes in a single memory access to the 64 byte wide memory. The ingress port uses 80 ns of the memory bandwidth every 5120 ns to write the data received to memory; thus, a 64 byte wide memory with an access time of 80 ns can support 64 (5120 ns/80 ns) 100 M bits per second ports. With 64 ports connected to the switch each port cycle is 80 ns. An 80 ns port cycle provides one memory access per port cycle to each of the ports.

Increasing the memory bandwidth available in each port cycle, requires one or more of the following: decreasing the memory access time increasing the width of the memory (i.e. the number of bits read/written per memory cycle) or decreasing the number of ports. Increasing the width of the memory is limited by the minimum data packet size. Decreasing the memory access time is limited by the minimum memory access time for the memory.

Memory bandwidth may also be increased by interleaving memory banks for example, writing the first data packet to a first memory bank and a second data packet to a second data bank. However, interleaving data in a switch may result in blocking for example, if both port A and port B request access to the first memory bank at the same time. Blocking data transfers between the ingress port and the egress port may result in dropped packets; thus, it can not be used to increase memory bandwidth in a nonblocking switch.

SUMMARY OF THE INVENTION

A packet storage manager in a switch increases the memory bandwidth of a memory shared by ingress and egress ports connected to the switch. The packet storage manager performs both a write operation for one of the ingress ports and a read operation for one of the egress ports in a single port cycle where prior systems required successive read and write cycles. The write and read operations are performed concurrently to different memory in the memory in a single memory access cycle. The memory is physically divided into a number of banks. The number of banks is preferably two or four. The read and write operations are performed to different banks.

The packet storage manager includes read address logic, which selects a read address in memory for the read operation dependent on a port cycle, and write address logic which selects a write address for a write operation dependent on the read address selected by the read address logic. The write address selects the write address dependent on the read address, such that the read and write operations can be performed concurrently in a single memory access. The packet storage manager relies on a port queue for each egress port and a free list of addresses not stored in a port queue. From an incoming packet, the manager reads the network destination to determine an appropriate egress port or ports for which the packet is to be stored. The manager writes a packet segment into memory by removing a memory segment address from the free list, storing the segment address at the tail of each port queue to which the packet segment is directed and writing the packet segment to the location in memory specified by the segment address. Simultaneously, an address at the head of each port queue identifies the packet segment to be read by the manager.

The read address logic in the packet storage manager includes a port queue for each of the egress ports. The port queue stores the memory locations of data written to memory by each ingress port. Port queue select logic selects the port queue from which to remove a memory address dependent on the port cycle. Read select logic selects the memory location from which to read dependent on the memory address removed from the port queue.

The memory is physically divided into a number of banks. The number of banks are preferably two or four. The write address logic in the packet storage manager includes a bank free list for each of the banks. Each bank free list stores addresses of available locations in the bank of memory. Write select logic in the write address logic selects one of the bank free lists from which to remove a write address. The write select logic may select a bank free list so that sequential segments of a data packet are written to alternating odd and even banks of memory.

The write address logic may also include a bank free list counter for each bank. The bank free list counter stores a count of the available locations in the bank. The write select logic may select a bank free list dependent on the count in the bank free list counter. The concurrent read and write operations may be for the same port or may be to different ports.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 2 is a timing diagram illustrating the transfer of data from ingress ports to egress ports through the common memory in the switch;

DETAILED DESCRIPTION OF THE INVENTION

Figure 1A:
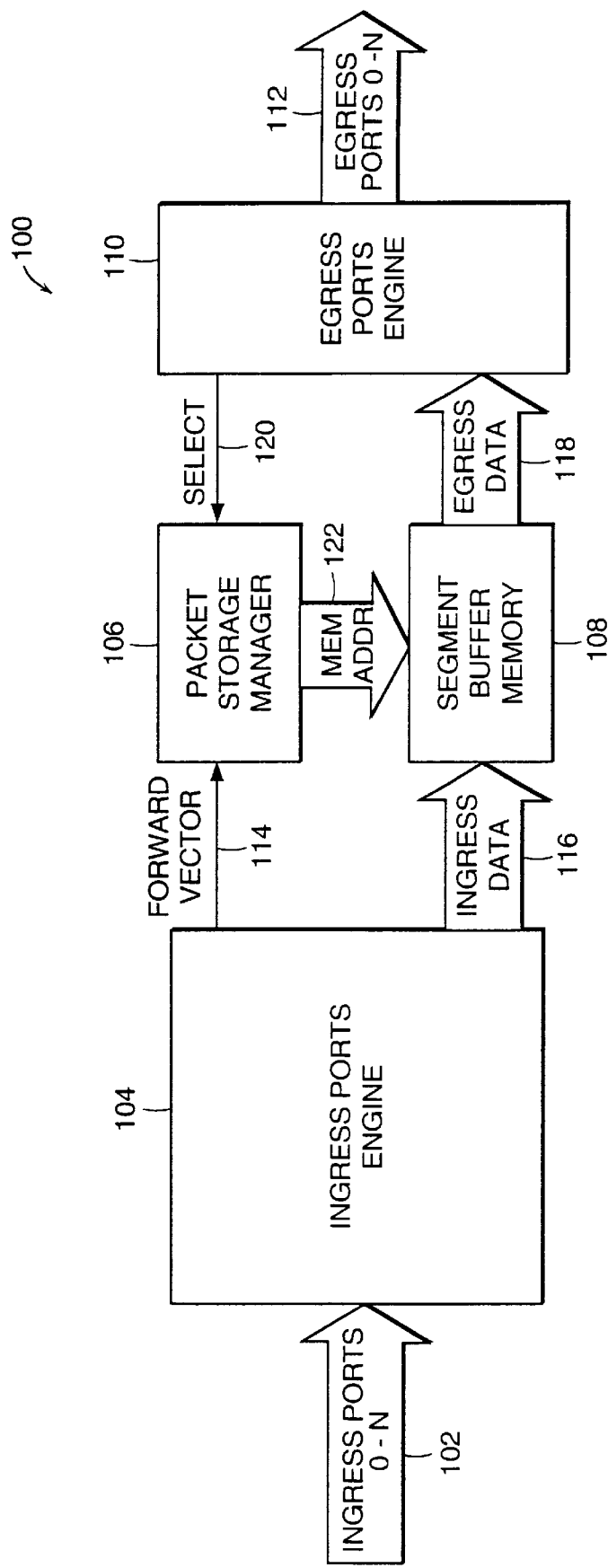
FIG. 1A is a block diagram of a non-blocking common memory switch.

FIG. 1A is a block diagram of a common memory switch 100. All data received on ingress ports 102 is stored in segment buffer memory 108 before being switched to one or more egress ports 112. The packet storage manager 106 controls write and read access to the segment buffer memory 108. Through the packet storage manager 106, a data packet segment arriving at an ingress port 102 is written to the segment buffer memory 108 and another data packet segment for an egress port 112 is read from the segment buffer memory 108 in the same memory access cycle.

The switch 100 includes an ingress ports engine 104 and an egress ports engine 110. A data packet is received serially at an ingress port 102. The ingress engine 104 detects and processes headers in the received data packet, determines from the detected header on which egress port 112 to forward the data packet and generates a forward vector 114 for the data packet. The forward vector 114 is a bit map, with a bit corresponding to each of the plurality of egress ports 112, indicating whether the data packet is to be forwarded to that egress port 112. The forward vector 114 is forwarded to the packet storage manager 106.

The packet storage manager 106 provides access to the segment buffer memory 108. The packet storage manager 106 provides segment buffer memory addresses 122 for read and write operations to the segment buffer 108 and stores in the manager 106 the locations in the segment buffer memory 108 of each data packet stored. The egress engine 110 selects one of the plurality of egress ports 112, through select control signals 120, on which to transmit a data packet and provides the stored data packet to the selected egress port 112.

The segment buffer memory 108 is a common memory shared by all ingress ports 102 and egress ports 112. The switch 100 is non-blocking, that is, a data packet arriving at any of the ingress ports 102 is not blocked from being forwarded to any of the egress ports 112. The switch 100 provides concurrent processing by the ingress port engine 104 of data packets received at ingress ports 102 and processing of stored data packets by the egress port engine 110 for egress ports 112.

As a data packet is received serially on one of the ingress ports 102, the serial data is grouped into data segments. The data segments are written to buffer segment memory 108. The width of a data segment is predetermined dependent on the networking protocol used by the ingress ports 102 and egress ports 112. For example, for the Ethernet networking protocol, the width of the data segment is 64 bytes because the minimum data packet size for an Ethernet data packet is 64 bytes.

Figure 1B:
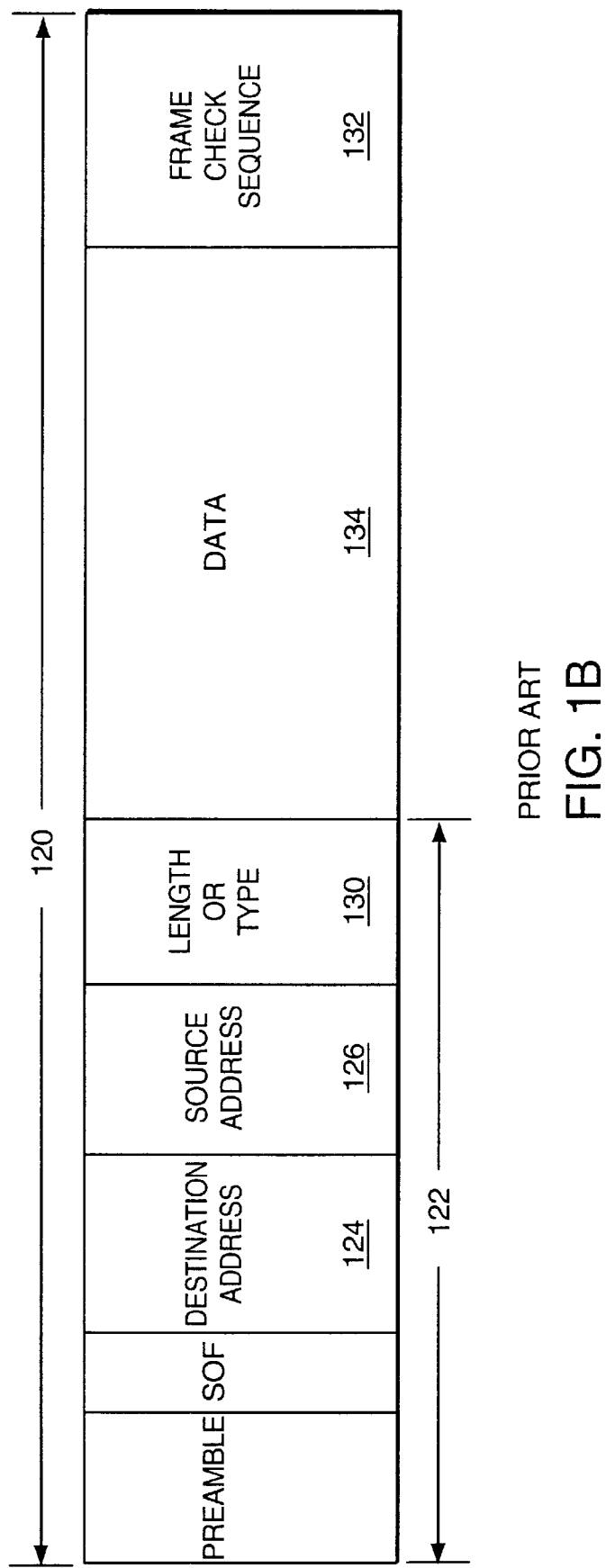
FIG. 1B is a block diagram of a prior art ethernet data packet which may be received at an ingress port.

FIG. 1B is a block diagram illustrating a prior art ethernet data packet 120 which may be received at an ingress port 102. The ethernet data packet includes a header 122, data field 134, and a frame check sequence 132. The header 122 includes a destination address 124, a source address 126, and a length or type field 130. The size of the data packet 120 is dependent on the size of data field 134, which can vary from 46 bytes to 1,500 bytes.

FIG. 2 is a timing diagram illustrating the switching of data received on ingress ports 102 to egress ports 112 through the segment buffer memory 108 in the switch 100. The timing diagram is described in conjunction with the block diagram in FIG. 1A for a three port switch (N=2), that is, with three ingress ports 102 and three egress ports 112.

From time 200 to time 202 a data segment is received serially at each of the three ingress ports 102. The data segment time slot 204 between time 200 and time 202 is the time taken to receive the data segment at the ingress port 102. While the data segment is being received, the ingress ports engine 104 determines from a destination address 124 in the header of the data packet, to which egress port 112 the data segment is to be forwarded. At time 202, all the data segments have been received and can be written to segment buffer memory 108 by the packet storage manager 106. The packet storage manager 106 writes all the received data segments to segment buffer memory 108 before time 206 at which time the next data segments are received.

The data segment time slot 204 is divided into port cycle time slots 208, with one port cycle time slot 208 per data segment time slot 204 assigned to each port connected to the switch 100. The port cycle time 208 is the memory access cycle, that is, the time provided to each port for accessing in segment buffer memory 108. At time 210 the packet storage manager 106 writes the data segment received on ingress port 0 102 to segment buffer memory 108. From time 212 to time 214, the packet storage manager 106 writes the data segment received on ingress port 1 102 to segment buffer memory 108. At time 214, the data segment received on ingress port 0 is available in memory and can be read by the egress port engine and forwarded on egress port 1. At time 214, the packet storage manager 106 writes the data received on ingress port 2 102 to segment buffer memory 108. At time 216, the data segment received on ingress port 1 is available in memory and can be read by the egress port engine and forwarded on egress port 2. At time 216, the packet storage manager 106 writes the next data segment received on ingress port 0 102 to segment buffer memory 108. At time 218, the data segment received on ingress port 2 is available in buffer segment memory 108 and can be read by the egress port engine 110 and forwarded on egress port 0 112.

Thus, data segments are written to segment buffer memory 108 by the packet storage manager 106, as they are received on the ingress ports 102. Data segments can be read from segment buffer memory 108 while the received data segments are being written. The ingress ports 102 are never blocked from writing the segment buffer memory 108 and the egress ports 112 are never blocked from reading the segment buffer memory 108.

Figure 3:
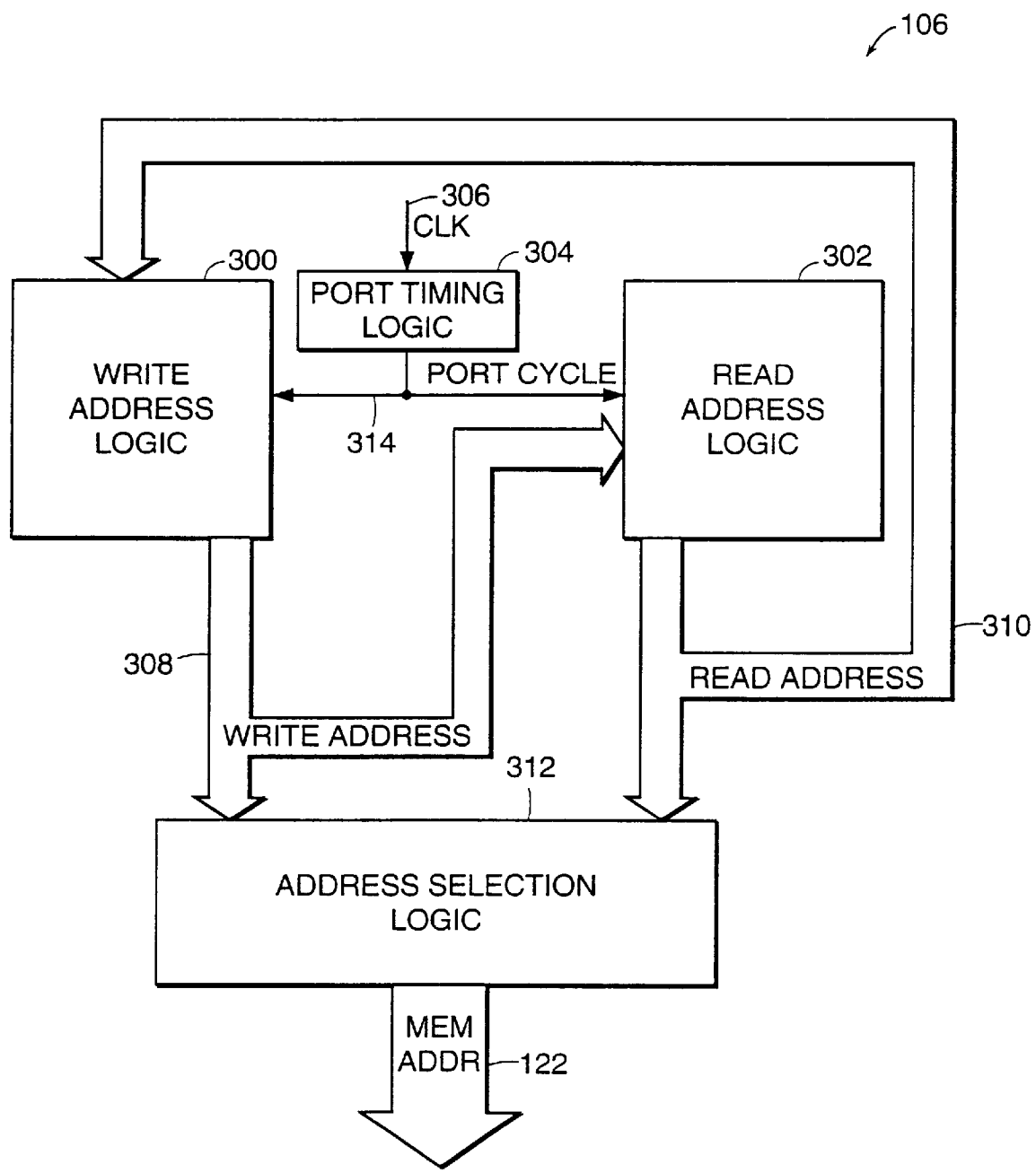
FIG. 3 is a block diagram illustrating the packet storage manager 106 shown in FIG. 1A.

FIG. 3 is a block diagram illustrating the packet storage manager 106 shown in FIG. 1A. The packet manager 106 concurrently handles requests to write to the segment buffer memory 108 from the ingress ports engine 104 (FIG. 1A) and requests to read the segment buffer memory 108 from the egress ports engine 110 (FIG. 1A).

The packet storage manager 106 includes write address logic 300, read address logic 302, port timing logic 304 and address selection logic 312. The write address logic 300 provides locations in buffer segment memory 108, in which data segments from ingress ports 102 (FIG. 1A) may be stored. The read address logic 302 provides locations in buffer segment memory 108, in which data packets for egress ports 112 have been stored.

The address selection logic 312 forwards the read address 310 and the write address 308 to the buffer segment memory address 122. The port timing logic 304 generates a port cycle 314 dependent on a clock 306 input. The port timing logic 304 generates the port cycle 314 for a pre-determined number of clock periods, a port cycle time 208, and generates a port cycle 314 for each of the ports 102, 112 every pre-determined data segment cycle time 204. The data segment cycle time 204 is dependent on the time to serially receive a data segment at any one of the ingress ports 102 (FIG. 1A). The read address 310 and write address 308 are selected for the port 102, 112, dependent on the port cycle 314. The same port cycle 314 may be provided by the port timing logic 304 to the write address logic 300 and the read address logic 302 as shown, or a different port cycle 314 may be provided by the port timing logic 304 to the write address logic 300 and the read address logic 302.

At the start of each port cycle 314, the read address logic 302 selects a previously queued read address 310 at the head of the port queue in the read address logic 302 for the port, dependent on the port cycle 314. The write address logic 300 selects a write address for the port cycle 314 dependent on the read address 310 selected by the read address logic 302.

The address selection logic 312 forwards the write address 308 and the read address 310 to the buffer segment memory 108 through the segment buffer memory address 122. The write address 308 of the data packet to be written to segment buffer memory 108 is queued in the read address logic 302. The read address 302 of the data packet to be read from buffer segment memory 108 is de-queued in the read address logic 302. The write address logic 300 and read address logic 302 are shown in greater detail in conjunction with FIGS. 5, 6, 10, and 11.

Figure 4:
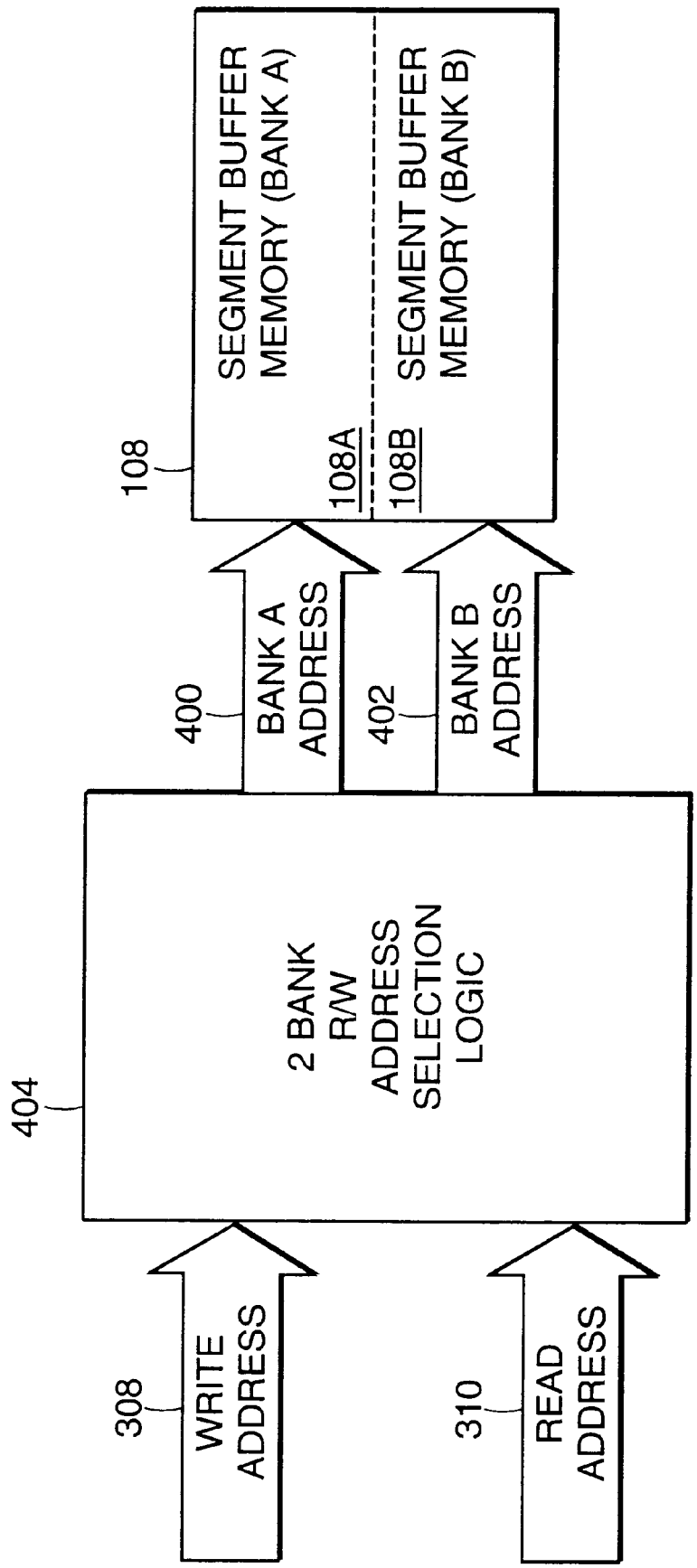
FIG. 4 is a block diagram illustrating the segment buffer memory 108 shown in FIG. 1A physically divided into two banks.

FIG. 4 is a block diagram illustrating the segment buffer memory 108 shown in FIG. 1A physically divided into two banks 108A, 108B. Each bank of the segment buffer memory 108 has an associated memory address, address_A 400 and address_B 402. The 2 bank address selection logic 404 forwards the write address 308 to address_A 400 or address_B 402 dependent on the bank of the segment buffer memory 108 encoded in the write address 308. The 2 bank address selection logic 404 forwards the read address 310 to address_A 400 or address_B 402 dependent on the bank of the buffer segment memory 108 encoded in the read address 310. For example, the Most Significant Bit ("MSB") of the read address 310 and write address 308 can be used to determine the bank of the segment buffer memory 108A, 108B and the write address 308 and the read address 310 are to be forwarded by the 2 Bank Address selection logic 404. The write address logic 300 (FIG. 3) and the read address logic 304 (FIG. 3) ensure that the read address 308 and the write address 310 issued during the same port cycle 314 (FIG. 2) are for different banks of segment buffer memory 108A, B. A read access to one bank of segment buffer memory 108 occurs concurrently with a write access to the other bank of the buffer segment memory 108.

Figure 5:
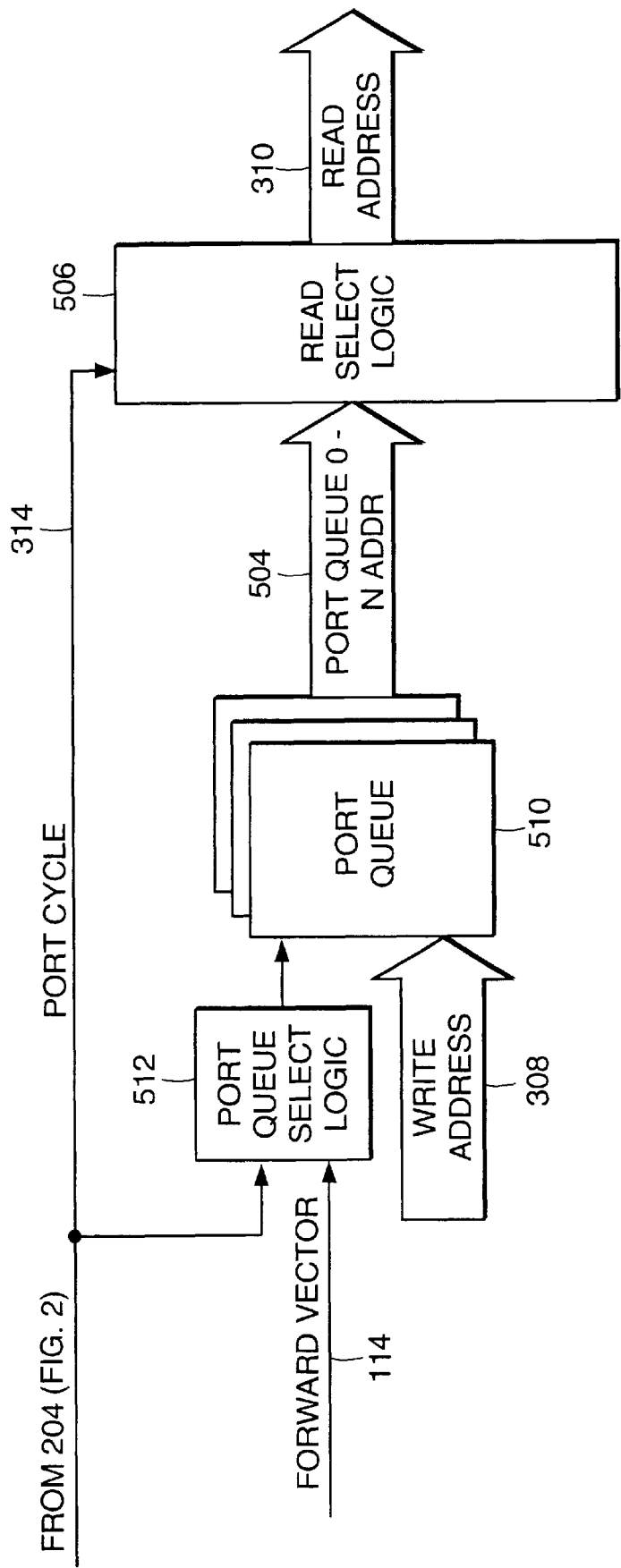
FIG. 5 is a block diagram illustrating the read address logic 302 shown in FIG. 3 for the two bank segment buffer memory shown in FIG. 4.

FIG. 5 is a block diagram illustrating the read address logic 302 shown in FIG. 3 for the two bank segment buffer memory 404 shown in FIG. 5. The read address logic 302 includes port queue select logic 512, port queues 510 and read address selection logic 506. The port queues 510 store the addresses of locations in segment buffer memory 108 of data packets to be provided to egress ports 112. A separate port queue 510 is provided for each egress port 112. As a data segment is written into the segment buffer memory 108, the location to which the data segment has been written, the write address 308, is stored (or queued) in one or more of the port queues 510. The port queues 510 to which the write address 308 is written are determined by the port queue select logic 512. The port queue select logic 512 selects the port queue 510 dependent on the forward vector 114. The generation of the forward vector 114 has been described in conjunction with FIG. 1A.

After the data segment at the write address 308 stored in the port queue 510 has been read from segment buffer memory 108 by every egress port to which a copy is to be sent, the stored write address 308 is dequeued from the port queue 510.

Figure 6:
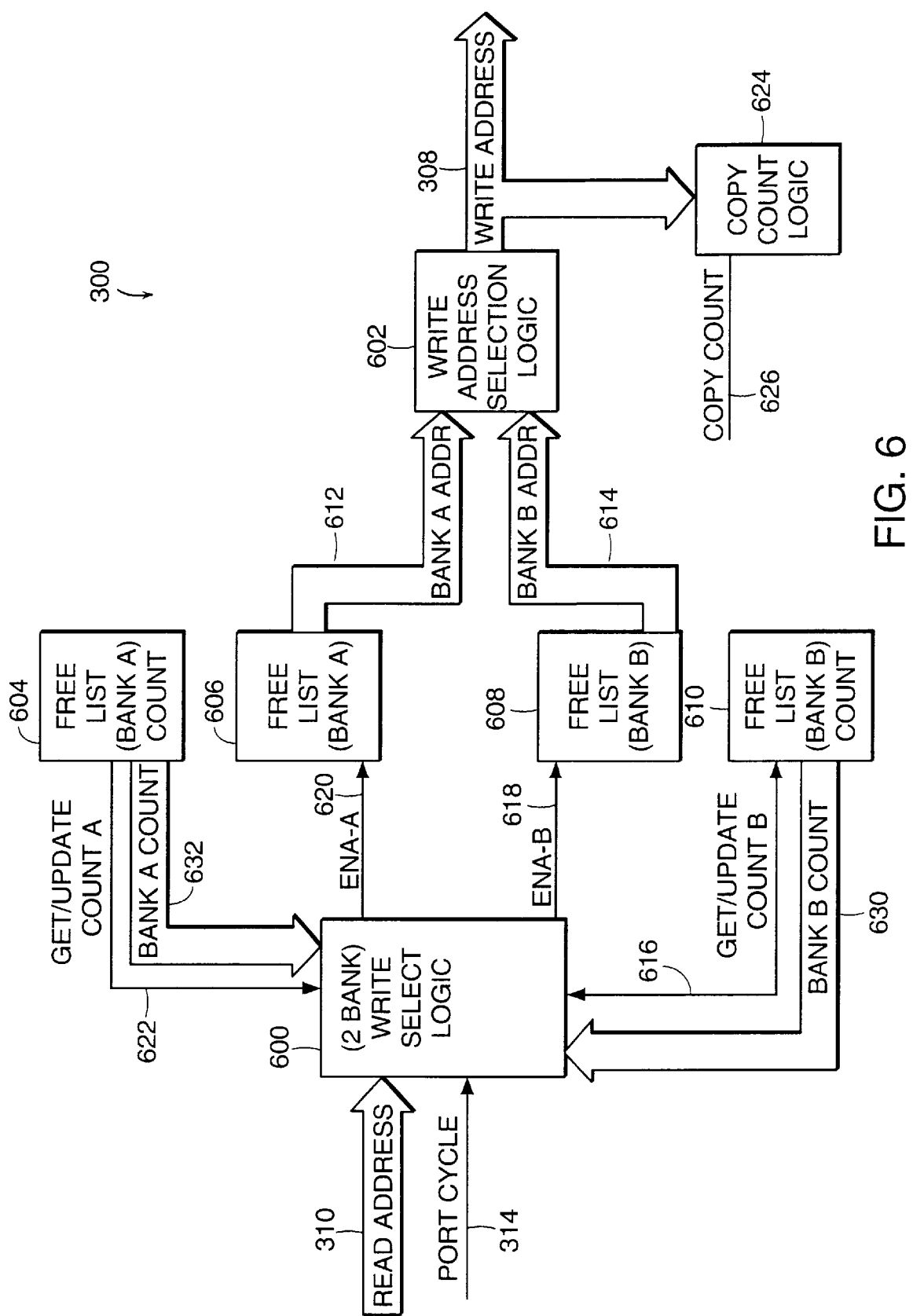
FIG. 6 is a block diagram illustrating the write address logic shown in FIG. 3 for the two bank segment buffer memory shown in FIG. 4.

FIG. 6 is a block diagram illustrating the write address logic 300 shown in FIG. 2 for the two bank segment buffer memory 108A, 108B shown in FIG. 4. The write address logic for a two bank segment buffer memory 108A, 108B includes a two-bank write select logic 600, a free list for bank_A 606, a free list for bank_B 608, a count for the free list for bank_A 604, a count for the free list for bank_B 610 and a write address selection logic 602

Each free list 606, 608 stores available locations in the free list's respective bank of segment buffer memory 108A, 108B, in which data segments may be written. The free list for bank_A 606 stores available locations in bank_A of segment buffer memory 108A and the free list for the bank_B 108B stores available locations in the bank_B of segment buffer memory 108B.

The two bank write select logic 600 determines, during a port cycle time 314, the free list 606, 608 from which to extract a write address 308, dependent on the read address 310. The bank of segment buffer memory 108A, 108B may be selected dependent on the MSB of the read address 310 or any other bit of the read address 310. For example, if the two-bank write select logic 600 determines from the read address 310 that the read address 310 is for bank_A of segment buffer memory 108A, a write address is extracted from the free list for bank_B 608. If the read address 310 is for bank_B of the buffer segment memory 108B, a write address is extracted from the free list for bank_A 606. Thus, a data segment can be read from one bank of the segment buffer memory 108 while another data segment is written to the other bank of the segment buffer memory 108.

If the two bank write select logic 600 determines that the read address is for bank_A of buffer segment memory 108A, it enables the bank_B free list 608 through the ENA_B signal 618 so that the bank_B free list 608 can provide a bank_B address 614 to the write address selection logic 602. As an address is removed from the bank_B free list 608, the two bank write select logic 600 generates an update count_A signal to on the get/update count_A signals 622 decrement the free list count for bank_B 610.

While the data segment is written to the segment buffer memory 108 at the location specified by the write address 308, the write address 308 is removed from the respective free list 606, 608, and the write address 308 is written to the tail of one or more port queues 306, dependent on the forward vector 114. A copy count 626 is stored in the copy count logic 624 for the write address 308. The copy count is used to keep track of multicast packets, that is, packets that are queued to more than one egress port 112. The write address 308 is returned to the respective free list 606, 608 after the location specified by the write address 308 has been read by the read address logic 302 (FIG. 3) and the copy count associated with the write address 308 is zero.

If there is no data segment to be read for the current port cycle 314, and there is a data segment to be written, the two bank write select logic 600 determines the free list 606, 608 from which to extract the write address 308 dependent on the free list count 604, 610. The two bank write select logic 600 gets the current count from the free list count for bank_A 604 and the free list count for bank_B 610 through the get/update count_A signals 622 and the get/update count_B signals 616. The free list count for bank_A 632 and the free list count for bank_B 630 are forwarded to the two bank write address logic 600. The free list count 604, 610 with the largest count indicates the least full bank of segment buffer memory 108A, 108B. The two bank write address logic 600 compares the counts and generates an ENA_A signal 620 or an ENA_B 618 signal dependent on whether the bank_A count 632 or the bank_B count 630 is larger. The free list 606, 608 with the largest count 604, 610 is selected. The write address 308 is selected from the selected free list 606, 608. Thus, as data segments are written to segment buffer memory 108, they are evenly distributed between the two banks of segment buffer memory 108A, 108B.

Figure 7:
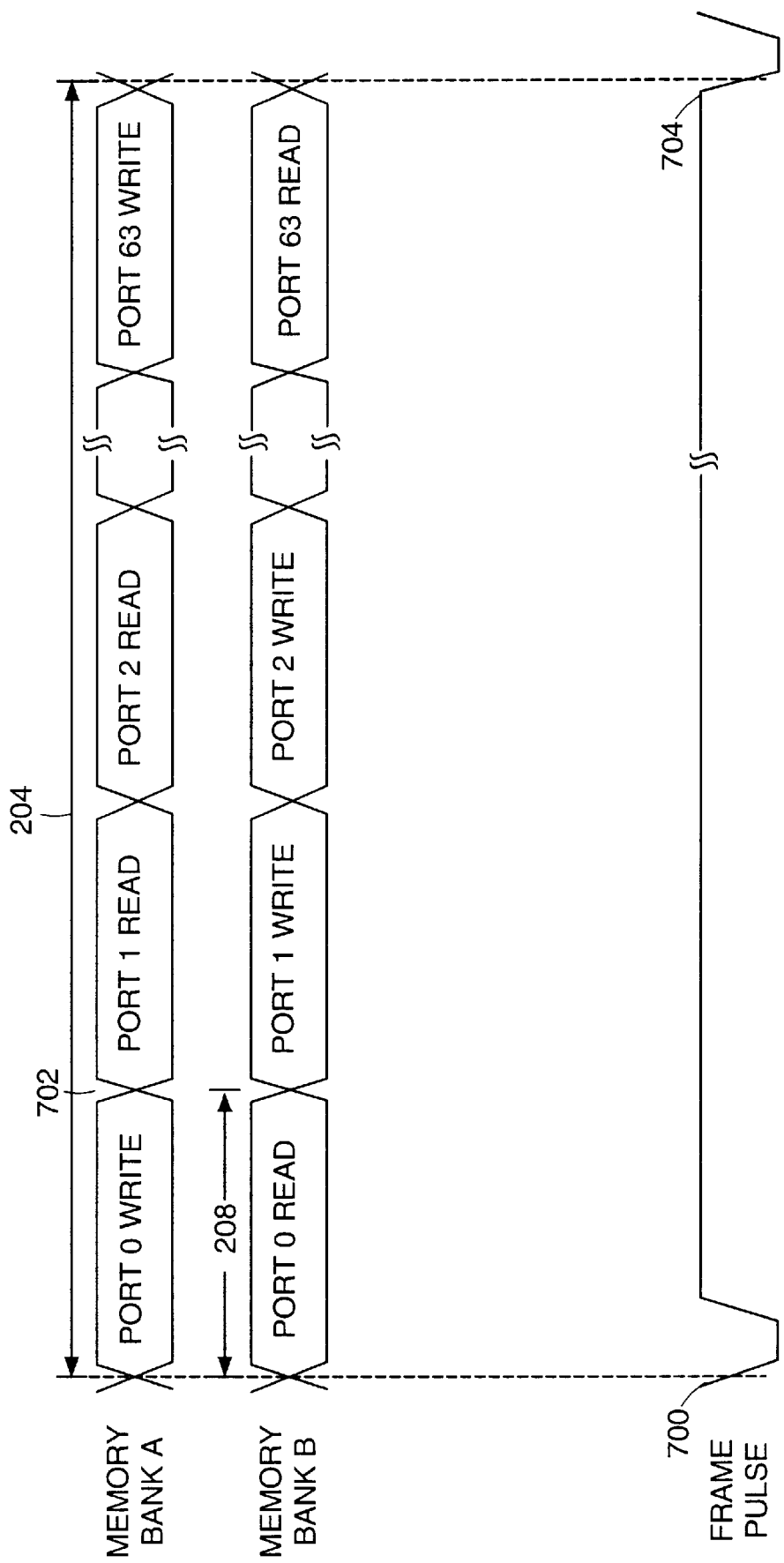
FIG. 7 is a timing diagram illustrating the timing of read and write addresses for the two bank segment buffer memory shown in FIG. 4.

FIG. 7 is a timing diagram illustrating the timing for read and write addresses for the two bank segment buffer memory 108 shown in FIG. 6. Two accesses to segment buffer memory are provided for each of the sixty-four ports connected to the switch 100 in each data segment time slot 204. The data segment time slot 204 is the time to receive a packet segment at any one of the 64 ports. Thus, the data segment time 204 is the maximum time available in which to store a packet segment in segment buffer memory 108 for each of the ports connected to the switch 100.

The data segment time slot 204 is dependent on the speed at which data is received at an ingress port 112 and on the network protocol implemented for transmitting data. For example, if the network protocol being used is 100 Megahertz Ethernet, a bit is received on each port every 10 ns, a byte is received every 80 ns and a minimum packet size of 64 bytes is received every 5120 ns. Thus, with a port cycle time of 80 ns a minimum packet size can be stored every 5120 ns for each of the 64 100 MHz Ethernet ports connected to the switch 100 (FIG. 1A).

Each port is assigned a port cycle time 208 in which to access segment buffer memory 108. A data segment can be read and written from different addresses in segment buffer memory 108 every port cycle time 208. The port cycle time 208 is dependent on the data segment time slot 204 and the number of ports connected to the switch 100.

At time 700, the start of a data segment time slot 204, a frame pulse is generated by pulsing the frame pulse signal. The frame pulse signal may be used to initialize the port timing logic 304 (FIG. 3). At 700, the port cycle 208 for port 0 starts. A write address for ingress port 0 may be issued to buffer segment memory 108A while a read address for egress port 0 may be sent to the B bank of buffer segment memory 108B.

At time 702, the port cycle 208 for port 1 starts. A read address for ingress port 0 may be issued to buffer segment memory 108A while a write address for egress port 0 is issued to the B bank of buffer segment memory 108B.

At time 704, the end of a data segment time slot 204, a frame pulse is generated by pulsing the frame pulse signal. A port cycle has been generated for each of the 64 ports connected to the switch during the data segment time slot 204.

Figure 8:
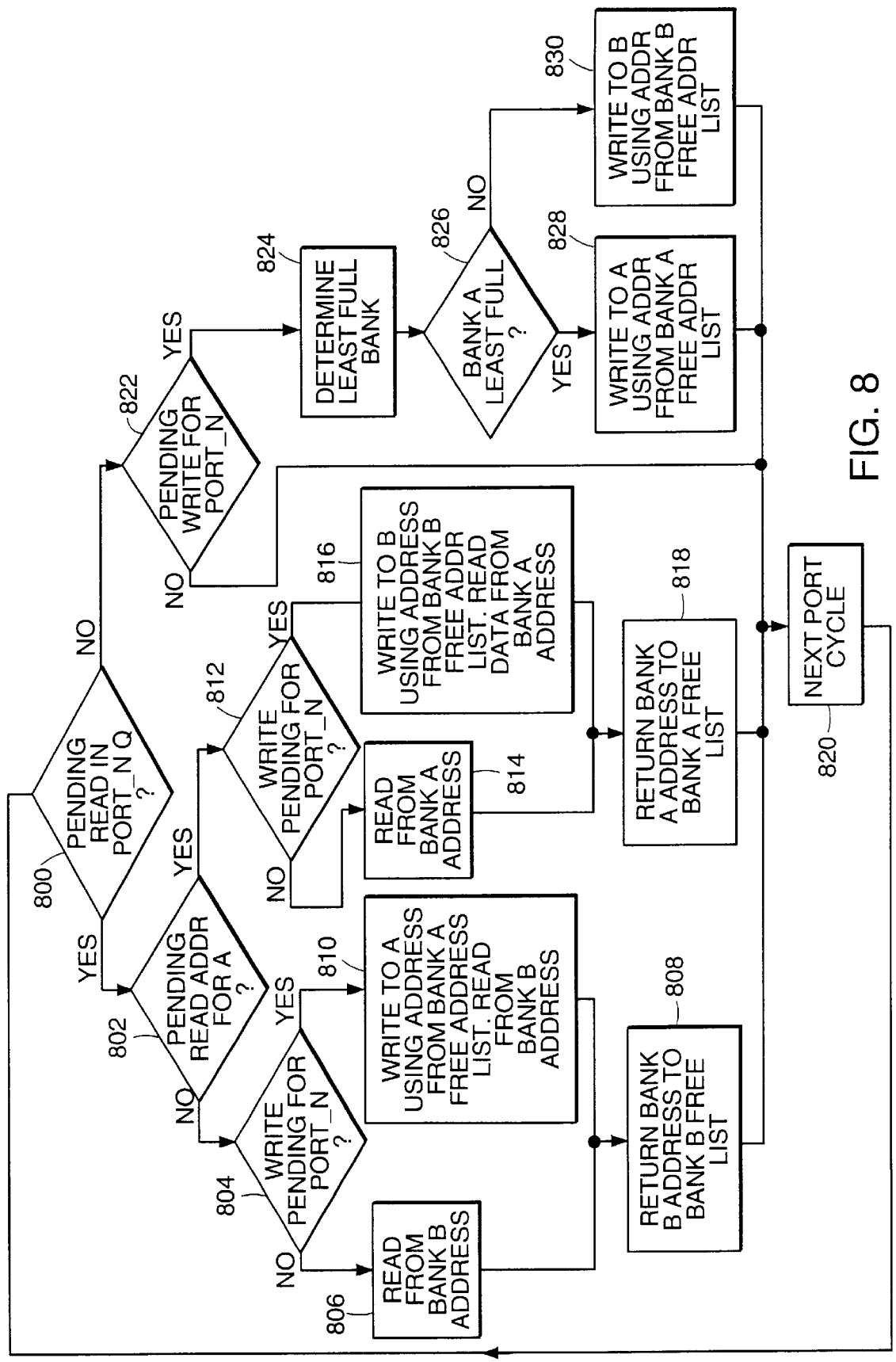
FIG. 8 is a flow graph illustrating the steps for selecting read and write addresses for the two bank segment buffer memory shown in FIG. 4.

FIG. 8 is a flow graph illustrating the steps taken by the packet storage manager 106 for selecting read and write addresses for the two bank segment buffer memory 108A, 108B shown in FIG. 3. As shown in FIG. 8 for each port cycle 314, the read and write addresses are for the same port, that is, the ingress port 102 and the egress port 112 are the same port. However, the ingress port 102 and egress port 112 do not have to be the same port as shown, the read address and the write address may be for different ports. FIG. 8 is described in conjunction with FIGS. 4–7.

In step 800, the two bank write select logic 500 determines if there is a pending read for the egress port 112. If there is a pending read, processing continues with step 802. If there is no pending read, processing continues with step 822.

In step 802, the two bank write select logic 600 determines to which bank of segment buffer memory 108A, 108B the read address is to be issued, through the memory access logic 312. If the read address 310 is for bank_A 108A, processing continues to step 812. If the read address 310 is for bank_B 108B, processing continues with step 804.

In step 804, the two bank write selection logic 600 determines if there is a pending write dependent on the port cycle 314. If there is a pending write for the port, processing continues with step 810. If there is not, processing continues with step 806.

In step 810, the two bank write selection logic 600 extracts the address of an available location in bank_A of segment buffer memory 108A from the free list for bank_A 606. Bank_A address 612 from the free list for bank_A 604 is selected as the write address 308 by the write address selection logic 602. The free list count for bank_A 604 is decremented. The write address 308 and the read address 310 are forwarded to the respective banks of the segment buffer memory 108A, 108B through the memory access logic 312. Processing continues with step 808.

In step 806, the read address is forwarded to the bank_B of the segment buffer memory 108B through the memory access logic 312. Processing continues with step 808.

In step 808, after the read operation has completed. The copy count 626 for the read address is decremented by the copy count logic 624. The read address 310 is returned to the free list for bank_B 608 and the free list count for bank_B 610 is incremented if the copy count 626 is zero. Processing continues with step 820.

In step 822, the write selection logic 600 determines if there is a write pending for the port. If there is a write pending for the port processing continues with step 824. If not, processing continues with step 820.

In step 824, the write selection logic 600 determines which bank of segment buffer memory 108A, 108B is least full from the count stored in the free list count for bank_A 604 and the count stored in the free list count for the bank_B 610. If the write select logic determines that bank_A of segment buffer memory 108A is least full, processing continues with step 828. If the two bank write select logic 600 determines that bank_B of segment buffer memory 108B is least full, processing continues with step 830.

In step 828, the write selection logic 600 removes the address of an available location in bank_A of segment buffer memory 108A from the free list for bank_A 604. Bank_A address 612 from the free list for bank_A 606 is selected as the write address 308 by the write address selection logic 602. As bank_A address 612 is removed from the free list for bank_A 606, the free list count for bank_A 604 is decremented. The write address 308 is forwarded to bank_A of the buffer segment memory 108A through the memory access logic 312 (FIG. 2).

In step 830, the write selection logic 600 removes the addresses of an available location from bank_B of segment buffer memory 108B from the free list for bank_B 608. The bank_B address 614 from the free list for bank_B 608 is selected as the write address 308 by the write address selection logic 602. As the bank_B address 614 is removed from the free list for bank_B 608, the free list count for bank_B 610 is decremented. The write address 308 is forwarded to bank_B of the buffer segment memory 108B through the memory access logic 312 (FIG. 2).

In step 812, the write logic 600 determines if there is a write operation pending for the port. If there is a write pending processing continues with step 816. If not, processing continues with step 814.

In step 816, the write selection logic 600 removes the address of an available location in bank_B of segment buffer memory 108B from the free list for bank_B 608. The bank_B address 614 from the free list for bank_B 608 is selected as the write address 308 by the write address selection logic 602. As bank_B address 614 is removed from the free list for bank_B 608, the free list count for bank_B 610 is decremented. The write address 308 and the read address 310 are forwarded to the respective banks of the buffer segment memory 108A, 108B through the memory access logic 312 (FIG. 2). Processing continues with step 818.

In step 814, the write selection logic 600 forwards the read address to bank_A of the segment buffer memory 108A through the memory access logic 312 (FIG. 2). Processing continues with step 818.

In step 818, after the read operation has completed the copy count for the read address is decremented by the copy count logic 624. The read address 310 is returned to the free list for bank_A 606 and the free list count for bank_A 604 is incremented if the copy count is zero. Processing continues with step 820.

In step 820, the port timing logic 304 (FIG. 3) is incremented to the next port cycle 314. Processing continues with step 800 for the next port cycle.

Figure 9:
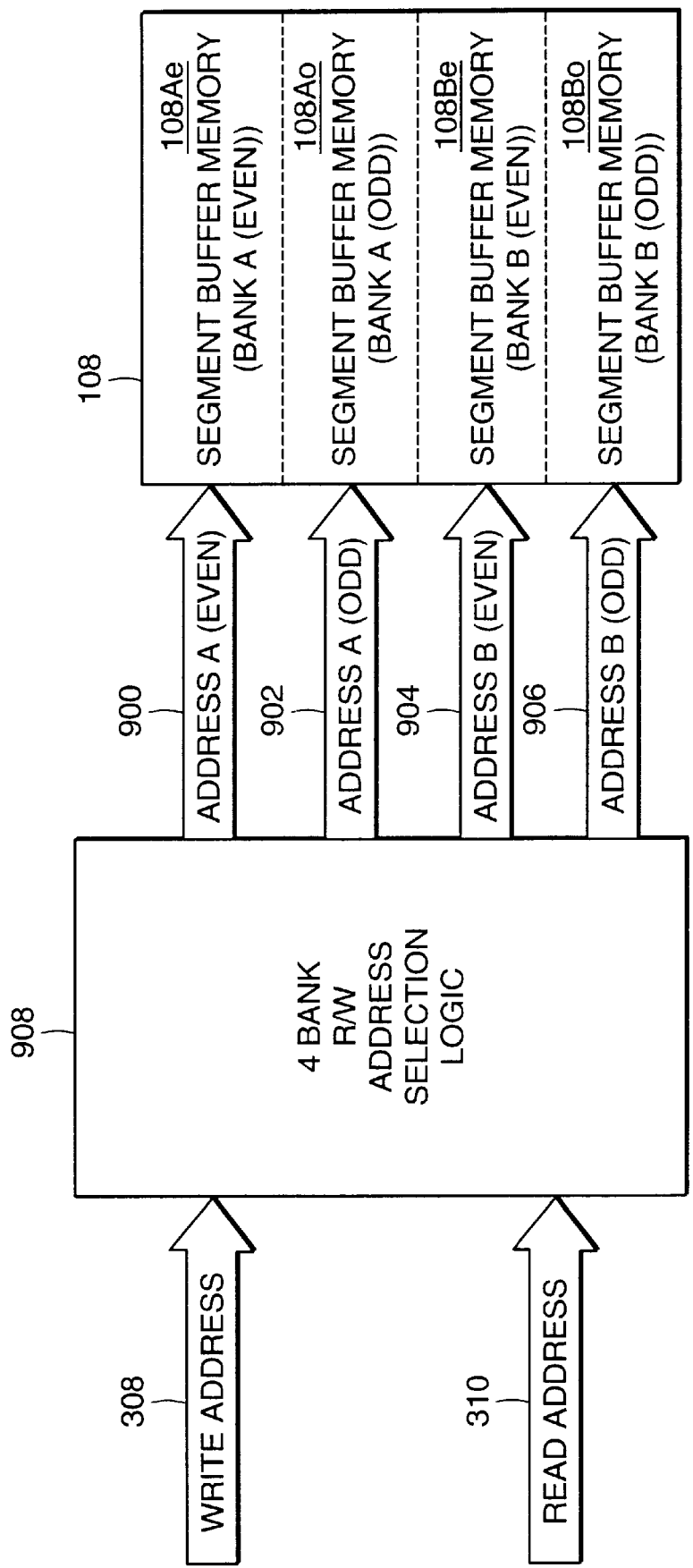
FIG. 9 is a block diagram illustrating the segment buffer memory shown in FIG. 1A physically divided into four banks.

FIG. 9 is a block diagram illustrating the segment buffer memory shown in FIG. 1A physically divided into four banks, segment buffer memory (bank_A (even)) ("Ae") 108Ae, segment buffer memory (bank_A (odd)) ("Ao") 108Ao, segment buffer memory (bank B(even)) ("Be") 108Be and segment buffer memory (bank B (odd)) ("Bo") 108Bo. The memory may be physically divided into four banks dependent on the two MSBs of the memory address, for example, the MSB bit selecting the A or B bank and the MSB-1 memory address selecting the odd or even bank.

Each bank of the segment buffer memory 108 has an associated memory address, address_Ae 900 and address_Ao 902, address_Be 904 and address_Bo 906. The memory access logic 12 forwards the write address 308 to address_Ae 900, address_Ao 902, address_Be 904 or address_Bo 906 dependent on the bank of the segment buffer memory 108 encoded in the write address 308 and the port cycle. The memory access logic 312 forwards the read address 310 to address_Ae 900, address_Ao 902, address_Be 904 or address_Bo 906 dependent on the bank of the segment buffer memory 108 encoded in the read address 310 and the port cycle.

The memory bandwidth provided to each of the ports per data segment time is increased by a factor of two by implementing two port cycles 314 for each port in each data segment time, an even port cycle and an odd port cycle. The even banks 108Ae, 108Be are accessed during the even cycle and the odd banks 108Ao, 108Bo are accessed during the odd cycle. The write address logic 300 (FIG. 3) and the read address logic 302 (FIG. 3) ensure that the read address 308 and the write address 310 issued in each port cycle are for different banks of buffer segment memory 108Ae, 108Ao, 108Be, 108Bo. Thus, during an even cycle a read access to bank_Ae 108Ae occurs concurrently with a write access to bank Be 108B.

By providing two port cycles for each port in every data segment time and providing a concurrent read and write access for each port cycle, the bandwidth of the segment buffer memory 108 is increased by a factor of four for each port connected to the switch 100. Thus, in each data segment time, four accesses to segment buffer memory 108 may be performed for each port. The memory accesses are provided in pairs with a read operation for one of the even banks performed concurrently with a write operation to another even bank.

Figure 10:
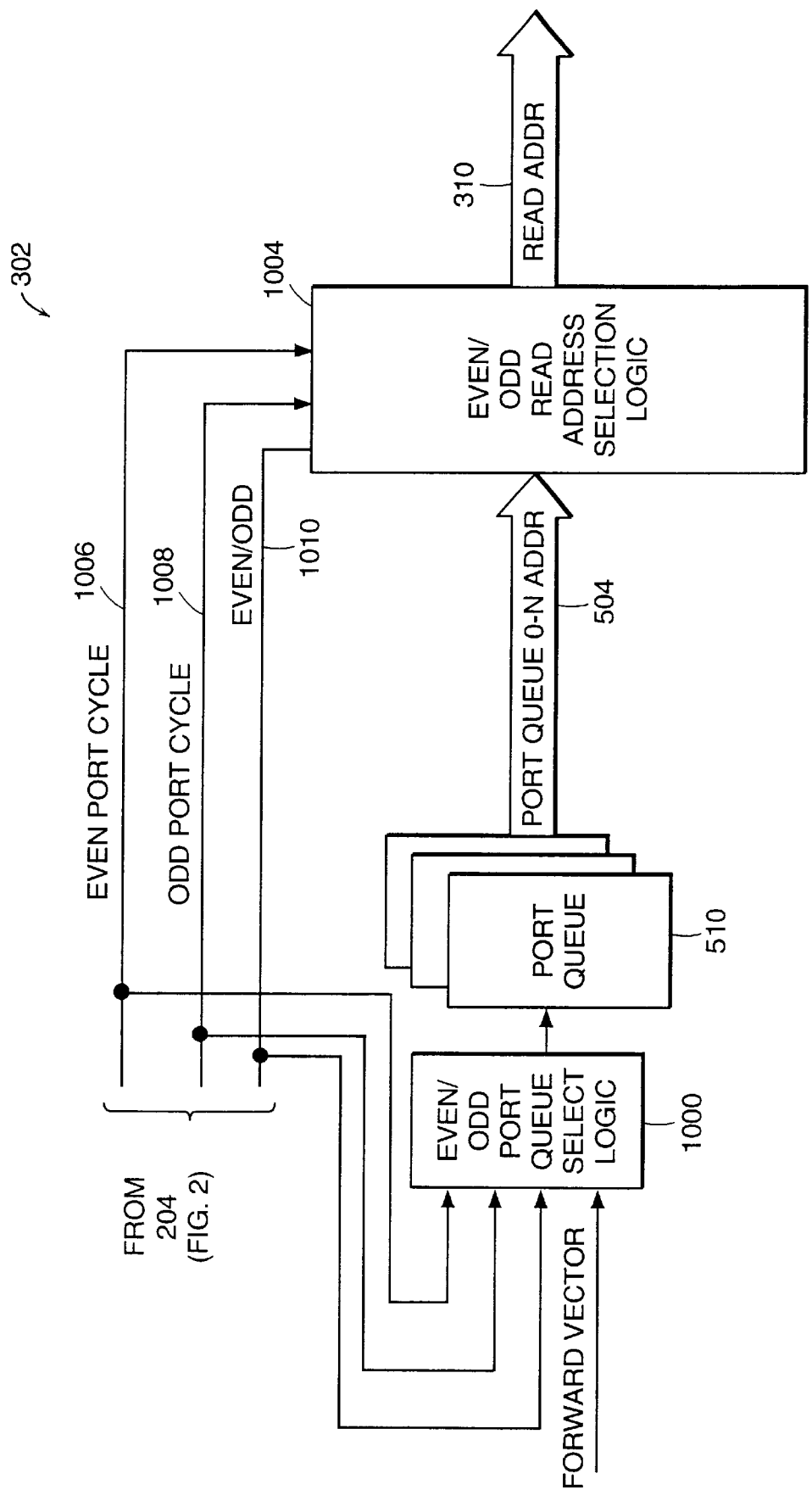
FIG. 10 is a block diagram illustrating the read address logic shown in FIG. 3 for the four bank segment buffer memory shown in FIG. 9.

FIG. 10 is a block diagram illustrating the read address logic 302 shown in FIG. 3 for the four bank segment buffer memory 108 shown in FIG. 9. The read access logic 302 (FIG. 3) includes even/odd port queue select logic 1000, a port queue 510 for each of the egress ports 112, and even/odd read address selection logic 1004. For a four bank segment buffer memory 108, the port timing logic 304 (FIG. 3) generates an even port cycle 1006 and an odd port cycle 1008 each for a pre-determined number of clock periods and an even/odd signal 1010 in every data segment time slot 204 (FIG. 2). A timing diagram example of an even port cycle 1006 and an odd port cycle 1008 is described in conjunction with FIG. 10.

The port queues 510 have already been described in conjunction with FIG. 5. The even/odd port queue select logic 1000 selects a port queue 510 to read dependent on the state of the odd port cycle 1006 and even port cycle 1008 and even/odd signal 1010 from the port timing logic 304 (FIG. 3). If either the odd port cycle 1006 or the even port cycle 1008 for the port is active, the location 504 of the next data segment to be read for the port is selected from the port queue 510 and forwarded to the even/odd read address selection logic 1004.

The even/odd read address location selection logic 1004 forwards the address 504 provided by the port queue 510 dependent on the state of the even port cycle 1006 and the odd port cycle 1008. If the location 504 is odd and the odd port cycle 1008 is active, the location 504 is forwarded to the even/odd read address selection logic 1004. If the location 504 is odd and the even port cycle 1006 is active, the location 504 is not forwarded to the even/odd read address selection logic 1004, but if the location 504 is even the location 504 is forwarded. Thus, in a data segment time, a port may read two locations of data segments from the segment buffer memory 108, if the data segments are stored in odd and even banks of the segment buffer memory 108.

Figure 11:
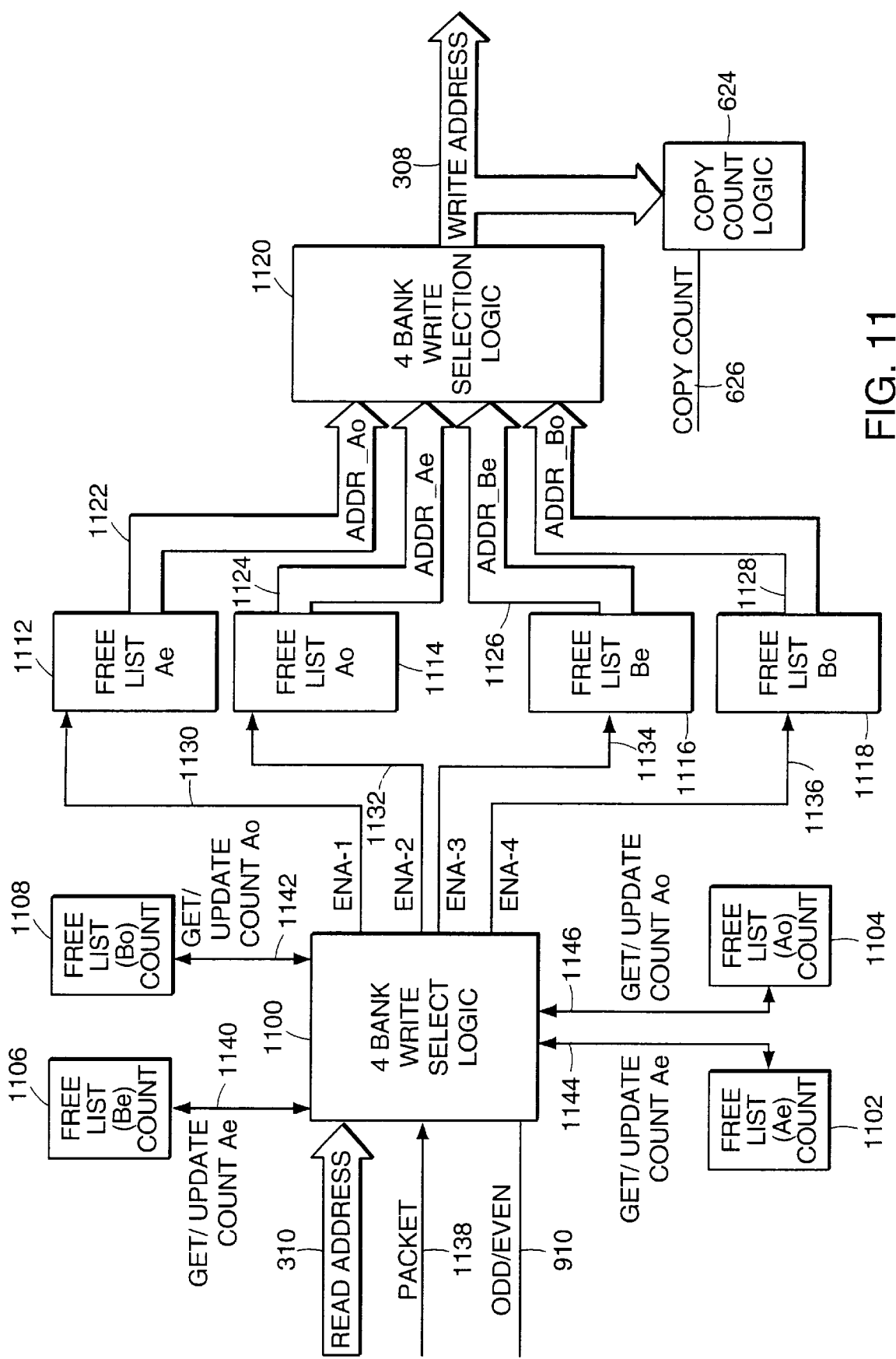
FIG. 11 is a block diagram illustrating the write address logic shown in FIG. 3 for the four bank segment buffer memory shown in FIG. 9.

FIG. 11 is a block diagram illustrating the write address logic shown in FIG. 3 for the four bank segment buffer memory 108 shown in FIG. 9. The four bank write select logic 1100 selects a write address 308 for one of the four banks of segment buffer memory 108Ao, 108Ae, 108Bo, 108Be. Each of the banks of the buffer segment memory 108Ae, 108Ao, 108Be, 108Bo has an associated free list 1112, 1114, 1116, 1118 and free list count 1102,1104, 1106, 1108.

The four bank write select logic 1100 determines the free list 1112, 1114, 1116, 1118 from which to extract a write address dependent on the read address 310, even/odd signal 910. If the four bank write select logic 1100 determines from even/odd signal 910 that the memory access is for the even cycle and the read address 310 is for the Ae bank of the buffer segment memory 108Ae, a write address is extracted from the free list for the Be bank 1106. If the four bank write select logic 1100 determines from even/odd signal 910 that the memory access is for the even cycle and the read address 310 is for the Be bank of the buffer segment memory 308Be, a write address is extracted from the free list for the Ae bank 1112.

If the four bank write select logic 1100 determines that the read address is for the Ae bank of buffer segment memory 108Ae, it enables the free list for the Be bank 1116 through the ENA_3 signal 1134 so that the free list for the Be bank 1116 can provide a Be bank address 1126 to the four bank write address selection logic 1120. As an address is removed from free list for the Be bank, the four bank write select logic 1100 generates an update count Be signal on the get/update count Be signals 1140 to update the free list for the Be bank 1116 by decrementing the free list count for bank_Be 1140.

If there is no valid read address, the four bank write select logic 1100 determines the free list 1112, 1114, 1116, 1118 from which to extract the write address 308 dependent on the free list count 1102, 1104, 1106, 1108. The free list count 1102, 1104, 1106, 1108 with the largest value indicates the bank of segment buffer memory 108Ae, 108Ao, 108Be, 108Bo with the greatest number of available locations. The free list 1112, 1114, 1116, 1118 associated with the greatest number of available locations in the free list count 1102, 1104, 1106, 1108 is selected to provide the next location in segment buffer memory 108 to be written. Thus, as data is written, it is evenly distributed between the banks of buffer segment memory 108Ae, 108Ao, 108Bo, 108Be.

For example, if there is no read address 310 for the current port cycle 314, the two bank write select logic 1100 gets the current count from the free list count for the Ae bank 1102 and the free list count for the Be bank 1106 through the get/update count Ae signals 1144 and get/update count Be 1140 signals. The free list count for bank_Ae 1102 and the free list count for bank_Be 1106 are forwarded to the four bank write address logic 1100. The 2 bank write address logic 600 compares the counts and generates an ENA_1 signal 1130 or an ENA_3 signal 1134 dependent on whether the bank_Ae count 1106 or the bank_Be count 1102 is larger.

After one of the free list write addresses 1122, 1124, 1126, 1128 is selected, the write address 308 is forwarded to the segment buffer memory 108 through the four bank write address selection logic 1120. A copy count 626 is stored in the copy count logic 624 for the write address 308. The copy count 626 is used to keep track of multicast packets, that is, packets are queued to more than one egress port 112.

Figure 12:
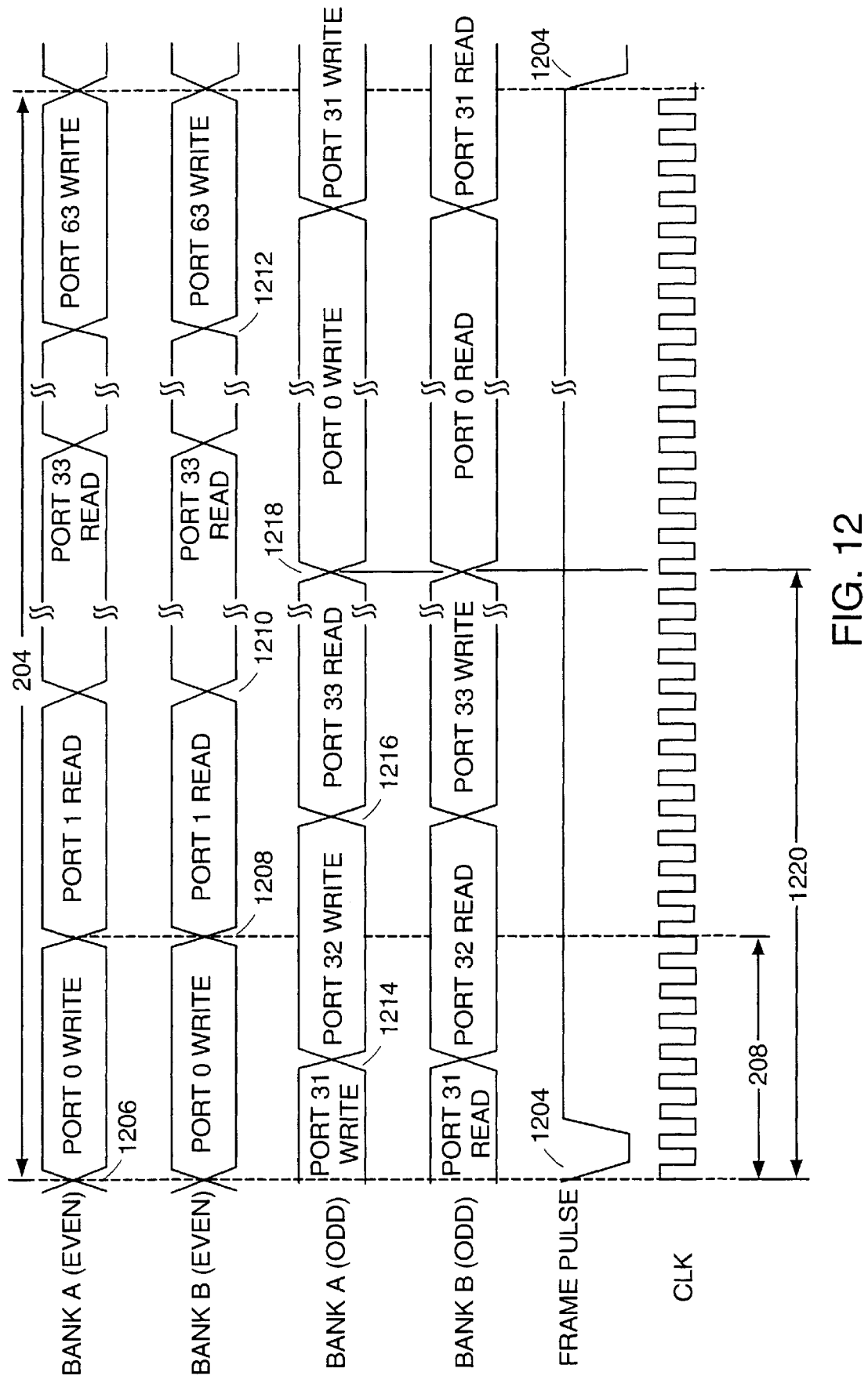
FIG. 12 is a timing diagram illustrating the timing of read and write addresses for the four bank segment buffer memory shown in FIG. 9.

FIG. 12 is a timing diagram illustrating the timing of read and write addresses for the four bank segment buffer memory 108 shown in FIG. 9. Four accesses to segment buffer memory are provided for each of the sixty-four ports connected to the switch 100 in each data segment time slot 204. The data segment time slot 204 is the time to receive a data segment at any one of the 64 ports. Thus, the data segment time 204 is the maximum time available in which to store a data segment in segment buffer memory 108 for each of the ports connected to the switch 100.

Each port is assigned a port cycle time 208 in which to access segment buffer memory 108. A data segment is read or written from a bank of the data segment memory for a port during a port cycle time 208. The port cycle time 208 is dependent on the data segment time slot 204 and the number of ports connected to the switch 100. The access time of the segment buffer memory 108 (FIG. 1A) is dependent on the port cycle time 208.

At 1204, at the start of each data segment time slot 204, a frame pulse is generated by pulsing the frame pulse signal. The frame pulse signal may be used to initialize the port timing logic 304 (FIG. 3). At 1206, the even cycle for port 0 starts. A write address for port 0 is sent to the Ae bank of buffer segment memory 108Ae while a read address for port 0 is sent to the Be bank of buffer segment memory 108Be. At time 1214, the odd cycle for port 32 starts, a write address for port 32 is sent to the Ao bank of buffer segment memory 108Bo while a read address for port 32 is sent to the Bo bank of buffer segment memory 108Bo. The start of the odd cycle for port 32 1214 occurs at half port cycle time 208 after the start of the even cycle for port 0 1206. This delay between the start of the even cycle and the start of the odd cycle allows the use of common logic in the buffer segment memory 108 by the odd cycle and the even cycle. If the common logic is not used the start of the odd cycle and the start of the even cycle may be scheduled at the same time.

At 1218, the start of an odd cycle for port 0 is scheduled half a data segment time slot 204 plus half a port time slot 208 after the start of the even cycle for port 0. This time is delay time 1220 in FIG. 12. For example, if the data segment time slot 204 is 5120 ns (64 bytes, 8 bits per byte, 10 ns per byte) and the start of the even port cycle for port 0 1206 starts at 0, the start of the odd port cycle for port 0 is scheduled 2200 ns (5120/2+40) after the start of the even port cycle for port 0 1206.

In a data segment time slot 204, the switch 100 can receive data packets with byte counts which are not a multiple of the data segment size. These data packets take approximately the same amount of time to be received as a minimum size data packet. For example, to store a 65 bytes data packet received at ingress port 0 within a data segment time slot 204, the first 64 bytes are written to segment buffer memory 108 during the even cycle for port 0 and the last byte is written to segment buffer memory 108 during the odd cycle for port 0.

The switch 100 may receive data packets greater than one data segment. While receiving data for the same data packet, the four-bank write select logic 1100 through a packet signal 1138 ensures that write addresses 208 for sequential data segments for the same packet are selected from alternating even and odd free lists. For example, if the first segment is written to a write address 308 selected from the free list for even bank_B 1116, the next sequential segment is written to a write address 308 selected from the free list for odd bank_B 918 or odd bank_A 1114, dependent on whether there is a read from bank_A 108Ao or bank_B 108Bo.

Figure 13:
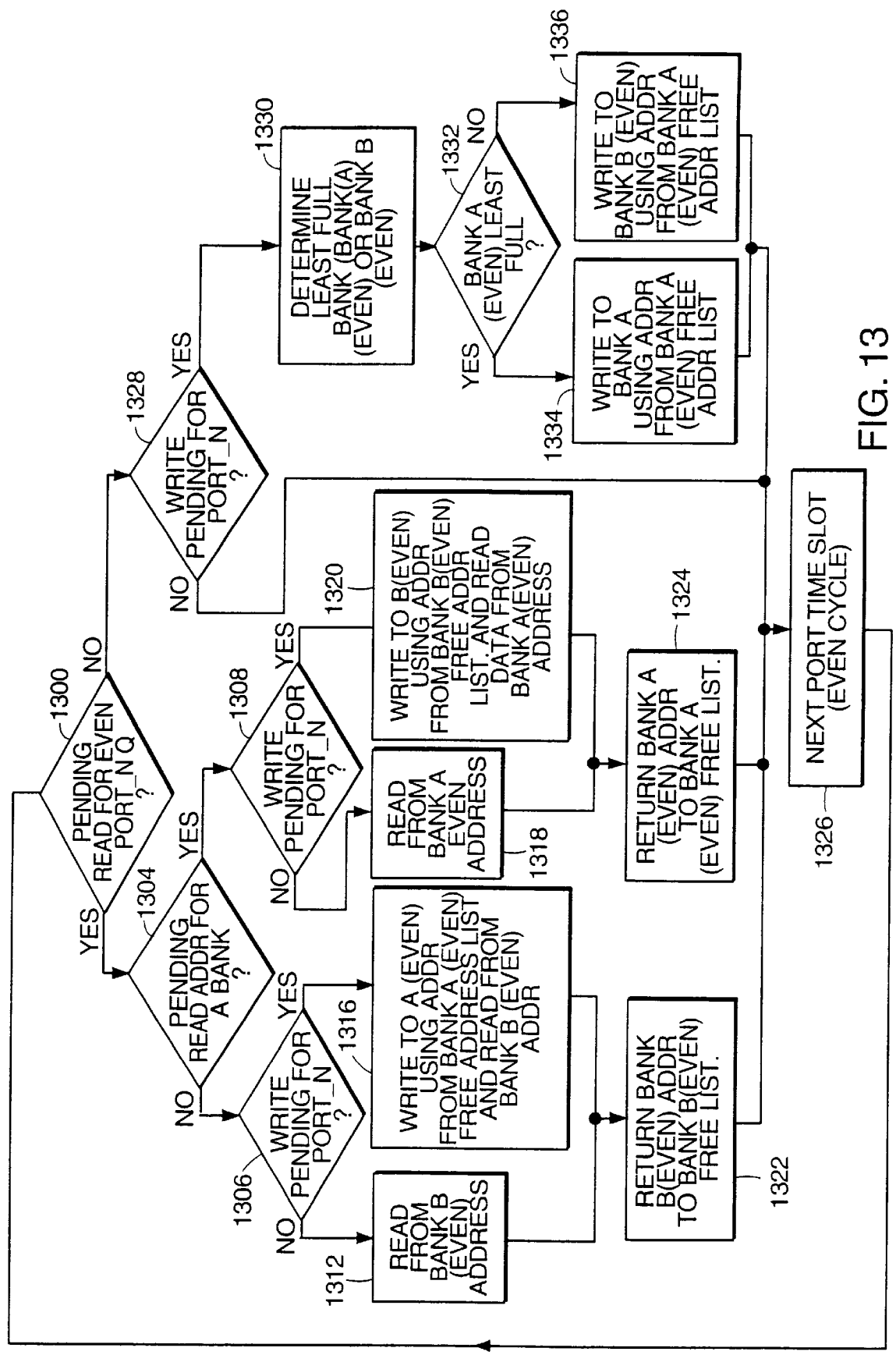
FIG. 13 is a flow graph illustrating the steps for selecting read and write addresses for the even banks of the four bank segment buffer memory shown in FIG. 9.

FIG. 13 is a flow graph illustrating the steps for selecting read and write addresses for the even banks of the four bank segment buffer memory shown in FIG. 9.

The even banks of the segment buffer memory 108Ae, 108Be are selected in an even port time slot. The same steps are performed for read and write address selection for odd banks of the segment buffer memory 108Ao, 108Ae in an odd port time slot. As shown in FIG. 13 the read and write operations during the even port time slot are issued for the same port, that is, the ingress port 102 and the egress port 112 are the same port. The ingress port 102 and egress port 112 do not have to be the same port as shown, the read operation and the write operation may be issued concurrently to different ports. FIG. 13 is described in conjunction with FIGS. 9–12.

At step 1300, the four bank write select logic 1100 determines if there is a valid read address 310 from the read select logic 1004 indicating a pending read for the egress port 112. If there is a pending read processing continues with step 1304. If not, processing continues with step 1328.

At step 1304, the four bank read select logic 1004 determines which even bank of segment buffer memory 108Ae, 108Be the read address is to be issued to through the memory access logic 312. If the read address 310 is for even bank_A 108Ae, processing continues to step 1308. If the read address 310 is for even bank_B 108Be, processing continues with step 1306.

At step 1308, the four bank write selection logic 1100 determines if there is a pending write for the ingress port 102 dependent on the port slot number 402. If there is a pending write for the ingress port, processing continues with step 1320. If not, processing continues with step 1318.

At step 1320, the four bank write selection logic 1100 extracts an available address for the even bank_3 of segment buffer memory 108Be from the free list for even bank_B 1116 through the ENA_B signal 1134. The even bank_B address 1126 from the even bank_B free list for bank_B 1116 is selected as the write address 308 by the four bank write address selection logic 1100. The even bank_B free list count 1106 is decremented through the get/update count Ae signals 1140. The write address 308 and the read address 310 are forwarded to the respective even banks of segment buffer memory 108Ae, 108Be through the four bank read/write address selection logic 908 (FIG. 9). Processing continues with step 1324.

At step 1318, the read address 310 is forwarded to even bank_A of segment buffer memory 108Ae, through the four bank read/write address selection logic 908. Processing continues with step 1324.

At step 1324, after the read operation has completed, the read address 310 is returned to the free list for even bank_A 1112 and the free list count for even bank_A 1102 is incremented. Processing continues with step 1326.

At step 1328, the four bank write selection logic 1100 determines if there is a write pending for the port. If there is a write pending for the port, processing continues with step 1330. If not, processing continues with step 1326.

At step 1330, the four bank write selection logic 1100 determines which even bank of buffer segment memory 108Ae, 108Be is least full from the count stored in the free list count for even bank_A 1102 and the count stored in the free list count for even bank_B 1106. If the write select logic determines that even bank_A of segment buffer memory 108Ae is least full, processing continues with step 1334. If the four bank write select logic 1100 determines that the even bank_B of buffer segment memory 108Be is least full, processing continues with step 1336.

At step 1334, the four bank write selection logic 1100 removes the address of an available location in even bank_A of segment buffer memory 108Ae from the free list for even bank_A 1112. Bank_A address 1122 from the free list for even bank_A 1112 is selected as the write address 308 by the four bank write address selection logic 1120. As even bank_A address 1122 is removed from the free list for even bank_A 1112, the free list count for even bank_A 1102 is decremented. The write address 308 is forwarded to even bank_A of segment buffer segment memory 108Ae through the four bank read/write address selection logic 908 (FIG. 9).

At step 1336, the four bank write selection logic 1100 removes an available address from even bank_B of segment buffer memory 108Be from the free list for even bank_B 1116. The even bank_B address 1126 from the free list for the even bank_B 1116 is selected as the write address 308 by the four bank write address selection logic 11120. As even bank_B address 1126 is removed from the free list for even bank_B 1106, the free list count for even bank_B 1116 is decremented. The write address 308 is forwarded to even bank_B of the buffer segment memory 108Be through the four bank read/write address selection logic 908 (FIG. 9).

At step 1306, the four bank write select logic 1100 determines if there is a write operation pending for the port. If there is a write pending processing continues with step 1316. If not, processing continues with step 1312.

At step 1316, the four bank write selection logic 1100 removes an available address in the even bank_A of segment buffer memory 108Ae from the free list for the even bank_A 1112. The even bank_A address 1122 from the free list for the even bank_B 1116 is selected as the write address 308 by the four bank write address selection logic 1120. As the even bank_B address 1126 is removed from the free list for the even bank_B 1112, the free list count for even bank_B 1102 is decremented. The write address 308 and the read address 310 are forwarded to the respective banks of the segment buffer memory 108Ae, 108Be through the four bank read/write address selection logic 908 (FIG. 9). Processing continues with step 1322.

At step 1312, the four bank write selection logic 1100 forwards the read address to even bank_A of segment buffer memory 108Ae through the four bank read/write address selection logic 908 (FIG. 9). Processing continues with step 1322.

At step 1322, after the read operation has completed, the read address 310 is returned to the free list for even bank_A 1112 and the free list count for even bank_A 1102 is incremented. Processing continues with step 1326.

At step 1326, processing for the next even port time slot begins. The next even port cycle 906 is determined by the port timing logic 304 (FIG. 2).

The invention is not limited to a buffer segment memory 108 (FIG. 1A) divided into two banks as described in conjunction with FIGS. 4–6 or divided into four banks as described in conjunction with FIGS. 9–13, the buffer segment memory 108 may be divided into any number of $2^N$ banks (where N=1, 2, 3, 4 . . . ).

While this invention has been particularly shown and described with references to preferred embodiments thereof, it will be understood by those skilled in the art that various changes in form and details may be made therein without departing from the scope of the invention encompassed by the appended claims.

What is claimed is:

1. A switch comprising:

a plurality of ingress ports;

a plurality of egress ports;

a memory shared by the plurality of ingress ports and the plurality of egress ports which stores an input data stream received from any of the plurality of ingress ports and provides an output data stream to any of the plurality of egress ports; and a packet storage manager which schedules a memory read operation for one of the plurality of egress ports and concurrently schedules a memory write operation for one of the plurality of ingress ports, a memory read operation and a memory write operation being scheduled for different portions of the memory in a single port cycle, the packet storage manager comprising:

read address logic which selects a read address for a first location in the memory for the memory read operation dependent on the port cycle, the read address logic comprises:

a port queue for each of the plurality of egress ports, the port queue storing the memory addresses of locations of data written to the memory by the packet storage manager dependent on the network destination in an incoming packet; and port queue select logic which selects a port queue from which to remove a memory read address dependent on the port cycle, the memory portion from which to read dependent on the memory read address removed from the head of the selected port queue; and write address logic which selects a write address for a second location in the memory for the memory write operation dependent on the read address selected by the read address logic.

2. The switch as claimed in claim 1, wherein the write address logic comprises:

a free list of addresses; and write select logic which provides the write address in memory by removing the write address from the free list, the read address logic storing the write address at the tail of each port queue to which the packet segment is directed, the packet storage manager writing the packet segment to another portion of the memory specified by the write address.

3. The switch as claimed in claim 2, wherein the memory is physically divided into a plurality of banks.

4. The switch as claimed in claim 3, wherein the number of banks is two.

5. The switch as claimed in claim 3, wherein the number of banks is four.

6. The switch as claimed in claim 3, wherein the write address logic further comprises a free list for each bank and the write select logic selects one of the free lists from which to remove a write address.

7. The switch as claimed in claim 6, wherein the write address logic selects a free list dependent on the read address.

8. The switch as claimed in claim 6, wherein the write address logic selects a free list such that sequential segments of a data packet are written to alternating odd and even banks of the memory.

9. The switch as claimed in claim 6, wherein the write address logic further comprises:

a free list counter for each of the plurality of banks, the free list counter storing a count of available locations in the bank, the write select logic selecting one of the free lists dependent on the counts in the free list counters.

10. The switch as claimed in claim 1, wherein the one of the ingress ports and the one of the egress ports is the same port.

11. The switch as claimed in claim 1, wherein the one of the ingress ports and the one of the egress ports are different ports.

12. A switch comprising:

a plurality of ingress ports;

a plurality of egress ports;

a memory shared by the plurality of ingress ports and the plurality of egress ports which stores an input data stream received from any of the plurality of ingress ports and provides an output data stream to any of the plurality of egress ports; and means for scheduling a memory read operation for one of the plurality of egress ports and for concurrently scheduling a memory write operation for one of the plurality of ingress ports, a memory read operation and a memory write operation being scheduled for different portions of the memory in a single port cycle, the means for scheduling further comprising:

means for selecting a read address in the memory for the memory read operation dependent on the port cycle, the means for selecting a read address comprises:

a port queue for each of the plurality of egress ports, the port queue storing the memory addresses of locations of data written to the memory by the means for scheduling dependent on the network destination in an incoming packet;

means for selecting the port queue from which to remove a read address dependent on the port cycle, the memory portion from which to read dependent on the read address removed from the head of the selected port queue; and means for selecting a write address in the memory for the memory write operation dependent on the read address selected by the read address logic.

13. The switch as claimed in claim 12, wherein the means for selecting a write address comprises:

a free list of addresses; and means for removing the write address from the free list and the means for selecting a read address storing the write address at the tail of each port queue to which the segment is directed and the means for removing providing the write address for writing the packet to the means for scheduling which writes the segment to another portion of the memory specified by the write address.

14. The switch as claimed in claim 13, wherein the memory is physically divided into a plurality of banks.

15. The switch as claimed in claim 14, wherein the number of banks is two.

16. The switch as claimed in claim 14, wherein the number of banks is four.

17. The switch as claimed in claim 14, wherein the means for selecting a write address further comprises a free list for each bank and the means for removing selects one of the free lists from which to remove a write address.

18. The switch as claimed in claim 17, wherein the means for selecting a write address selects a free list dependent on the read address.

19. The switch as claimed in claim 18, wherein the means for selecting a read address further comprises:
a free list counter for each of the plurality of banks, the free list counter storing a count of available locations in the bank, the means for selecting a write address selecting one of the free lists dependent on the counts in the free list counters.

20. The switch as claimed in claim 17, wherein the means for selecting a write address selects a free list such that the sequential segments of a data packet are written to alternating odd and even banks of the memory.

21. The switch as claimed in claim 12, wherein one of the plurality of ingress ports and one of the plurality of egress ports is the same port.

22. The switch as claimed in claim 12, wherein one of the plurality of ingress ports and one of the plurality of egress ports are different ports.

23. A method for increasing bandwidth of a common memory in a switch comprising:
receiving an input data stream in the memory from any one of the plurality of ingress ports;
providing an output data stream from the memory to any one of the plurality of egress ports; and
scheduling a memory read operation for one of the plurality of egress ports and concurrently scheduling a memory write operation for one of the plurality of ingress ports, a memory read operation and a memory write operation being scheduled for different portions of the memory in a single port cycle, the scheduling of the memory read operation and the memory write operation further comprising:
selecting a read address in the memory for the memory read operation dependent on the port cycle comprising:
storing the memory addresses of locations of data written to the memory in a port queue for each of the plurality of egress ports, the port queue dependent on the network destination in an incoming packet;
selecting the port queue from which to remove the read address dependent on the port cycle, the memory portion from which to read dependent on the read address removed from the head of the selected port queue; and
selecting a write address in the memory for the memory write operation dependent on the read address selected by the read address logic; and
scheduling the memory read operation and the memory write operation for different portions of the memory in a single port cycle.

24. The method as claimed in claim 23, wherein the step of selecting a write address comprises:
providing a free list of addresses;
removing the write address from the free list;
storing the write address at the tail of each port queue to which the packet segment is directed; and
providing the address for writing the packet segment to another portion of the memory specified by the write address.

25. The method as claimed in claim 24, wherein the memory is physically divided into a plurality of banks.

26. The method as claimed in claim 24, wherein the number of banks is two.

27. The method as claimed in claim 24, wherein the number of banks is four.

28. The method as claimed in claim 27, wherein the free list is selected dependent on the read address.

29. The method as claimed in claim 28, wherein the step of selecting a write address further comprises:
storing a count of available locations in a free list counter for each of the plurality of banks; and
selecting one of the free lists dependent on the counts in the free list counters.

30. The method as claimed in claim 27, wherein the bank free list is selected such that sequential segments of a data packet are written to alternatively odd and even banks of the memory.

31. The method as claimed in claim 24, wherein the step of selecting a write address further comprises:
storing addresses of available locations in a free list for each of the plurality of banks;
selecting one of the plurality of free lists; and
removing the write address from the selected free list.

32. The method as claimed in claim 23, wherein any one of the plurality of ingress ports and any one of the plurality of egress ports is the same port.

33. The method as claimed in claim 23, wherein any one of the plurality of ingress ports and any one of the plurality of egress ports are different ports.

* * * * *